Patented Mar. 31, 1936

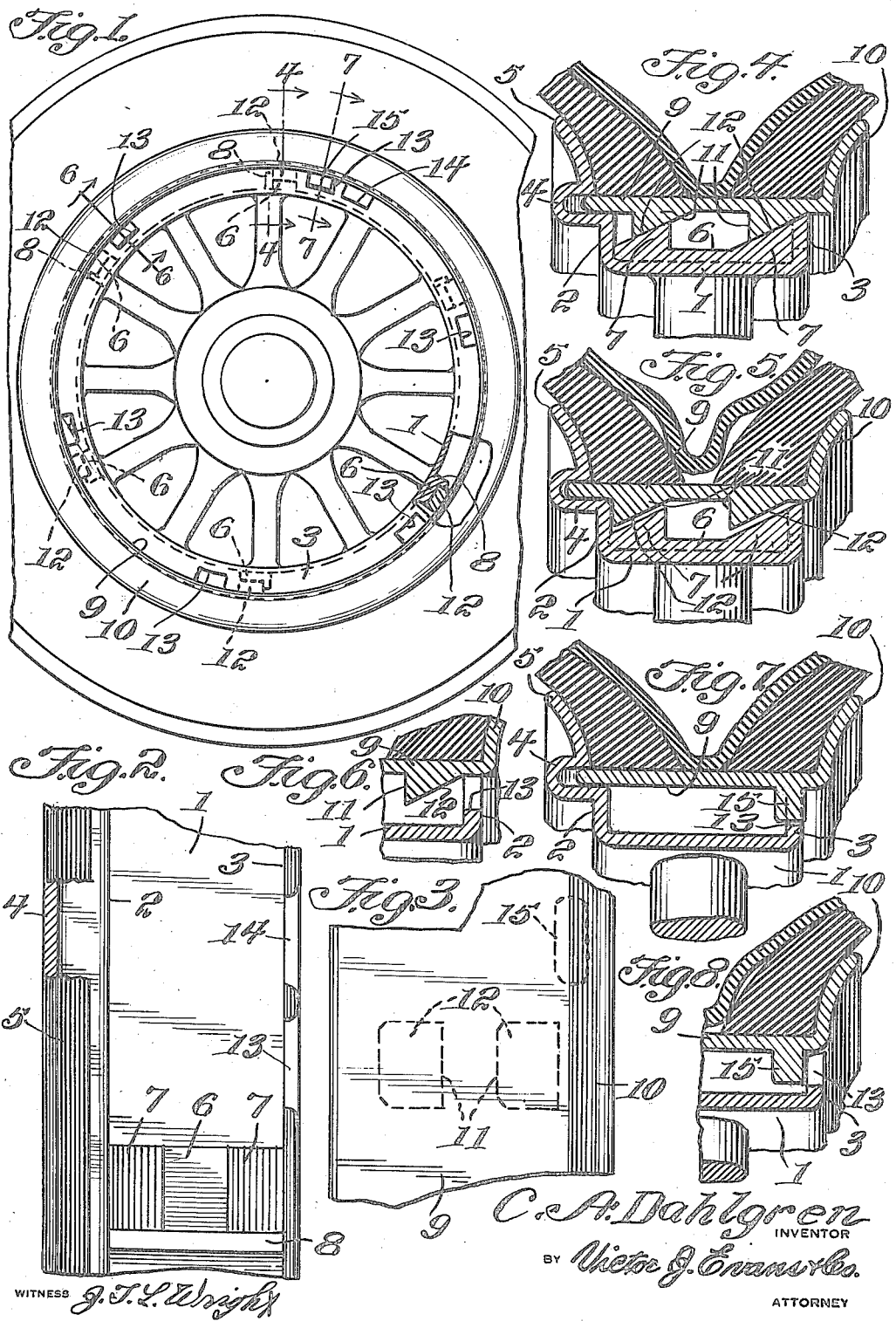

2,036,124

UNITED STATES PATENT OFFICE 2,036,124

TIRE RIM

Carl A. Dahlgren, Pettibone, N. Dak.

Application March 4, 1935, Serial No. 9,334

2 Claims. (Cl. 152—21)

This invention relates to pneumatic tire rims for vehicle wheels and its general object is to provide a rim that includes separate circumferential interfitting parts, one being fixed to the wheel and providing a felly therefor, and the other carrying the tire, with both including companion means for cooperative association and for locking the tire part to the wheel part.

A further object of the invention is to provide a pneumatic tire rim that is simple in construction, inexpensive to manufacture and to equip vehicles therewith, can be easily and expeditiously applied and removed with respect to a tire and its wheel, without tools, and is extremely efficient in use, operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a front view of a vehicle wheel showing my rim in use and with parts broken away and in dotted lines.

Figure 2 is a top plan view showing a fragmentary portion of the wheel part or section, of my rim.

Figure 3 is a similar view of the tire receiving part.

Figure 4 is a sectional view taken approximately on line 4—4 of Figure 1, looking in the direction of the arrows and showing the position of the parts after the tire is inflated.

Figure 5 is a similar sectional view showing the position of the parts before the tire is inflated.

Figure 6 is a sectional view taken approximately on line 6—6 of Figure 1, looking in the direction of the arrows, but before the cam faces of the cam lugs are arranged in face to face relation.

Figure 7 is a sectional view taken approximately on line 7—7 of Figure 1, looking in the direction of the arrows and shows the position of the locking lug after the tire is inflated.

Figure 8 is a sectional view somewhat similar to Figure 7 showing the position of the locking lug before the tire is inflated.

Referring to the drawing in detail, it will be noted that the wheel part or section of my rim is permanently fixed to the wheel and may be secured to the spokes to act as a felly.

The felly portion of the wheel carrying section of my rim includes a body 1 having flanges 2 and 3 formed on the outer circumferential edges thereof, and in the form as shown the spokes of the wheel are integral with the body 1. The flanges 2 and 3 provide with the body 1 an annular channel for a purpose which will be presently described and formed on the flange 2 is an outwardly directed annular bead 4 to provide a groove. The upper wall of the bead 4 has formed thereon an outwardly directed tire receiving flange 5 which is flared in curved formation.

Arranged at intervals in the channel provided by the body and the flanges 2 and 3, and fixed therein are cam members 6 each of which include a pair of cam lugs 7 that have their cammed faces inclined downwardly toward the inner side of the vehicle wheel as shown, and each cam member is provided with a cross strip 8 which bridges the channel and is preferably fixed to one longitudinal side of its cam member as best shown in Figure 2. These cross strips provide stops or abutting members for a purpose which will be presently apparent.

The tire receiving part or section of my rim includes a ring like body 9 that has formed on one circumferential edge thereof, an outwardly directed tire receiving flange 10 which cooperates with the flange 5, as clearly shown in the drawing. Formed on and extending inwardly from the ring like body 9 at intervals about its circumference are cam members in the form of lugs 11, similar to the lugs 7, there being a pair of lugs 11 for each pair of lugs 7, and the lugs 11 are provided with cammed faces 12 disposed in the same direction as the cammed faces of the cam lugs 7, for engagement therewith when the rim is in position for use, and the tire inflated as best shown in Figure 4, with the result it will be seen that the cammed faces of the lugs 7 and 11 set up a wedging action.

The flange 3 of the body 1 is provided with slots 13 arranged at intervals in its circumference there being a slot 13 for each pair of cam lugs 11 for the passage of the lugs 11 therethrough, as will be apparent, and the flange 3 is also provided with a slot 14 for the passage of a locking lug 15 that is formed on and extends inwardly from the ring like body 9.

In the use of my rim, the tire together with its tube which may be partially inflated is secured to the part or section that includes the body 9, therefore I term that section the tire part of my rim. This part is then disposed, after passing the cam lugs 11 through the slots 13 and the locking lug 15 through the slot 14, to the position as shown in Figure 6, with the inner edge of the body 9 arranged within the groove provided by the bead 4. After being so positioned, the part is then moved circumferentially of the wheel part until the cam lugs 11 contact the cross strips 8, so as to dispose the cam lugs 11 in face to face relation with the cam lugs 7 as shown in Figure 5. The locking lug 15 is then aligned with the slot 13 adjacent to the slot 14, as shown in Figure 8. The tire is then inflated to the proper pressure and this action will cause the tire part to move outwardly of the wheel part to dispose the cammed faces in contacting engagement as shown in Figure 4 and will likewise arrange the locking lug 15 in registration with the last mentioned slot 13 as shown in Figure 7 to prevent circumferential movement of the tire part as will be apparent.

From the above description and disclosure of the drawing, it will be obvious that I have provided a rim structure that not only positively fixes a tire to a vehicle wheel when disposed thereon for use, but the tire can be readily removed and applied with respect to the wheel and rim in an easy and expeditious manner without tools of any kind.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A wheel rim comprising separable cooperatively associated circumferential sections, one section being secured to the wheel and including a channel portion, cam members secured in the channel portion, the other section being adapted to receive a tire and including a body, cooperating tire flanges formed on the body and the first section respectively, cam members secured to the body and cooperating with the first cam members for securing the sections together the first section having slots arranged therein for the passage of the cam members of the body therethrough, and an additional slot, a lug on the body for passage through the last slot and for cooperation with one of the first mentioned slots to provide a locking means for holding the sections secured together.

2. A wheel rim comprising separable cooperatively associated circumferential sections, one section providing a felly for the wheel and including a channel portion and a circumferential groove, cam members secured in the channel portion, the other section being adapted to receive a tire and including a body receivable in the groove, cam members secured to the body and cooperating with the first mentioned cam members for securing the sections together, the first section provided with slots for the passage of the cam members of the body therethrough, abutting means for the last mentioned cam members to limit the circumferential movement of the tire receiving section in one direction, and locking means for holding the sections secured together.

C. A. DAHLGREN.